US012153821B2

United States Patent
Thangaraj et al.

(10) Patent No.: US 12,153,821 B2
(45) Date of Patent: Nov. 26, 2024

(54) ANALOG PERSISTENT CIRCUIT FOR STORAGE ACCESS MONITORING

(71) Applicant: INTERNATIONAL BUSINESS MACHINES CORPORATION, Armonk, NY (US)

(72) Inventors: Krishna Thangaraj, Poughkeepsie, NY (US); Heng Wu, Santa Clara, CA (US); Eric Raymond Evarts, Niskayuna, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/809,184

(22) Filed: Jun. 27, 2022

(65) Prior Publication Data
US 2023/0418504 A1 Dec. 28, 2023

(51) Int. Cl.
*G06F 3/06* (2006.01)
*G06F 12/0802* (2016.01)

(52) U.S. Cl.
CPC .......... *G06F 3/0653* (2013.01); *G06F 3/0616* (2013.01); *G06F 3/0679* (2013.01); *G06F 12/0802* (2013.01)

(58) Field of Classification Search
CPC .... G06F 3/0653; G06F 3/0616; G06F 3/0679; G06F 12/0802; G06F 11/3409; G06F 11/3037; G06F 11/3034; G06F 2201/88; G06F 2201/81
See application file for complete search history.

(56) References Cited

U.S. PATENT DOCUMENTS

| | | | |
|---|---|---|---|
| 9,299,400 B2 | 3/2016 | Bains | |
| 9,431,085 B2 | 8/2016 | Greenberg | |
| 10,019,350 B1 | 7/2018 | Lee | |
| 10,475,503 B2 | 11/2019 | Yoo | |
| 10,943,636 B1 | 3/2021 | Wu | |
| 10,964,378 B2 | 3/2021 | Ayyapureddi | |
| 10,970,226 B2 | 4/2021 | Liang | |
| 2021/0065775 A1 | 3/2021 | Hush | |
| 2021/0157735 A1 | 5/2021 | Pletka | |
| 2022/0379602 A1* | 12/2022 | Ng | B41J 2/04551 |

(Continued)

FOREIGN PATENT DOCUMENTS

EP 2992531 B1 6/2019

OTHER PUBLICATIONS

Ambrogio, et al., "Reducing the Impact of Phase-Change Memory Conductance Drift on the Inference of large-scale Hardware Neural Networks," IEEE Xplore, printed from the internet Apr. 26, 2022, 1 page.

(Continued)

*Primary Examiner* — Hiep T Nguyen
(74) *Attorney, Agent, or Firm* — Yee & Associates, P.C.

(57) ABSTRACT

A memory system for storage access monitoring is provided. The memory system includes a media controller of a memory. An analog persistent circuit is coupled to the media controller and configured to monitor access to the memory. The analog persistent circuit stores persistent data related to memory access counts access signals from the command/address bus. A command/address bus is coupled to the analog persistent circuit. A memory array is communicatively coupled to the command address and the media controller.

20 Claims, 9 Drawing Sheets

(56) References Cited

U.S. PATENT DOCUMENTS

2023/0268023 A1* 8/2023 Betser ................ H03M 1/1205
365/201
2023/0410875 A1* 12/2023 Park .................. G11C 11/40603

OTHER PUBLICATIONS

Kim, et al., Confined PCM-based Analog Synaptic Devices offering Low Resistance-drift and 1000 Programmable States for Deep Learning, IEEE Xplore, printed from the internet on Apr. 26, 2022, 1 page.

Mell et al., "The NIST Definition of Cloud Computing," Recommendations of the National Institute of Standards and Technology, U.S. Department of Commerce, Special Publication 800-145, Sep. 2011, 7 pgs.

Papandreou, et al., "Drift-Tolerant Multilevel Phase-Change Memory," IEEE Xplore, downloaded from the internet Apr. 26, 2022, 1 page.

* cited by examiner

ANALOG PERSISTENT CIRCUIT FOR STORAGE ACCESS MONITORING

BACKGROUND

Storage usage can be monitored by software defined strategies. Software monitoring is performed for both volatile and non-volatile memory. Existing storage usage monitoring methodologies use lookup tables. Lookup tables are maintained to track and record memory or storage access behavior patterns of target media. Current storage usage monitoring is often applied to target media with finite endurance, to assist in resource management and memory longevity.

SUMMARY

According to an embodiment described herein, a memory system for storage access monitoring is provided. The memory system includes a media controller of a memory. An analog persistent circuit is coupled to the media controller and configured to monitor access to the memory. The analog persistent circuit stores persistent data related to memory access counts access signals from the command/address bus. A command/address bus is coupled to the analog persistent circuit. A memory array is communicatively coupled to the command address and the media controller.

According to an embodiment described herein, an analog persistent memory circuit for storage access monitoring is provided. The analog persistent memory circuit includes an input buffer configured to receive access signals from a command/address bus. A command component is coupled to the input buffer and configured to process access signals from the command/address bus. A logic component is coupled to the command component and configured to process the access signals into one or more access counts. A memory component is coupled to the command component and the logic component and configured to store access counts. An output buffer is coupled to the logic component and configured to pass access count data to a memory controller.

According to an embodiment described herein, a computer implemented method for storage access monitoring is provided. The method monitors, by an analog persistent circuit, a command/address bus coupled to a memory. The analog persistent circuit identifies access instances to the memory array based on the monitoring of the command/address bus. The analog persistent circuit updates analog weights based on the access instances. A media controller determines the analog weights exceed a weights threshold. The method selects, using the media controller, a mitigation operation to perform on the memory array based on the access instances.

DETAILED DESCRIPTION

The present disclosure relates generally to systems, devices, and methods for storage usage monitoring. More particularly, but not exclusively, embodiments of the present disclosure relate to a system, a circuit, and a computer-implemented method for hardware-level storage usage monitoring by an analog persistent memory circuit.

Phase change memory (PCM), spin-transfer torque magnetoresistive RAM (STT-MRAM), and resistive random access memory (RRAM) are solid-state non-volatile (NV) memory technologies which may operate as analog storage devices. These memory technologies may be configured to demonstrate up to 1,000 unique levels per cell. Each level may be represented by a set conductance state that translates to an analog value. Such analog values may be decoded by tuned comparator circuits. Analog crossbar (XBAR) memory can be used in-situ with traditional memory modules and provide high programmability of bit information in a background circuit. The traditional memory modules may include dynamic random access memory (DRAM), static random access memory (SRAM), Flash, and NV-RAM memories.

Storage usage is often monitored by software defined strategies. Traditionally, memory monitoring for endurance, read errors, or scrubbing relies on controller logic in the form of software monitoring code. Software monitoring is often performed on finite endurance devices such as quad-level cell (QLC) flash memory, triple-level cell (TLC) flash memory, single-level cell (SLC) flash memory, phase change memory (PCM), STT-MRAM, and other similarly finite storage. Storage usage monitoring may also be beneficial in SRAM and DRAM. Such storage usage monitoring in SRAM and DRAM may be used to help mitigate row-hammering and improve spatial locality. The software monitoring intelligently records accesses to storage and moves data, in the case of wear leveling. Software monitoring methods may be performed by controller software and are often computationally and energy in-efficient.

Embodiments of the present disclosure provide hardware-level storage usage monitoring. The hardware-level storage usage monitoring may be in-situ monitoring with a computational control circuit. The computational control circuit operates out of band, outside of a data path, to accelerate computational capabilities while maintaining storage usage monitoring and while limiting software related overhead.

Some embodiments of the present disclosure enable an analog persistent circuit as a hardware-level storage usage monitoring circuit positioned within a memory system or chip. The analog persistent circuit may use non-volatile memory-based analog memory. In such instances, the analog persistent circuit provides persistence regardless of power cycling and assists in energy efficiency. Further, configurations of the analog persistent memory in the present disclosure provide storage usage monitoring with limited movement of data within memory of a computing device. Some embodiments of the present disclosure provide a low-controller overhead method of achieving memory access monitoring by parallel updating a multi-level programmable XBAR memory.

Some embodiments of the concepts described herein may take the form of a system or a computer program product. For example, a computer program product may store program instructions within at least a portion of an analog circuit or a memory system that, when executed by a media controller, cause the memory system to perform operations described above with respect to the computer-implemented method. By way of further example, the memory system may comprise components, such as media controllers, analog persistent circuits, and computer-readable storage media, within and outside of the analog persistent circuits. The computer-readable storage media may interact with other components of the memory system to cause the memory system to execute operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
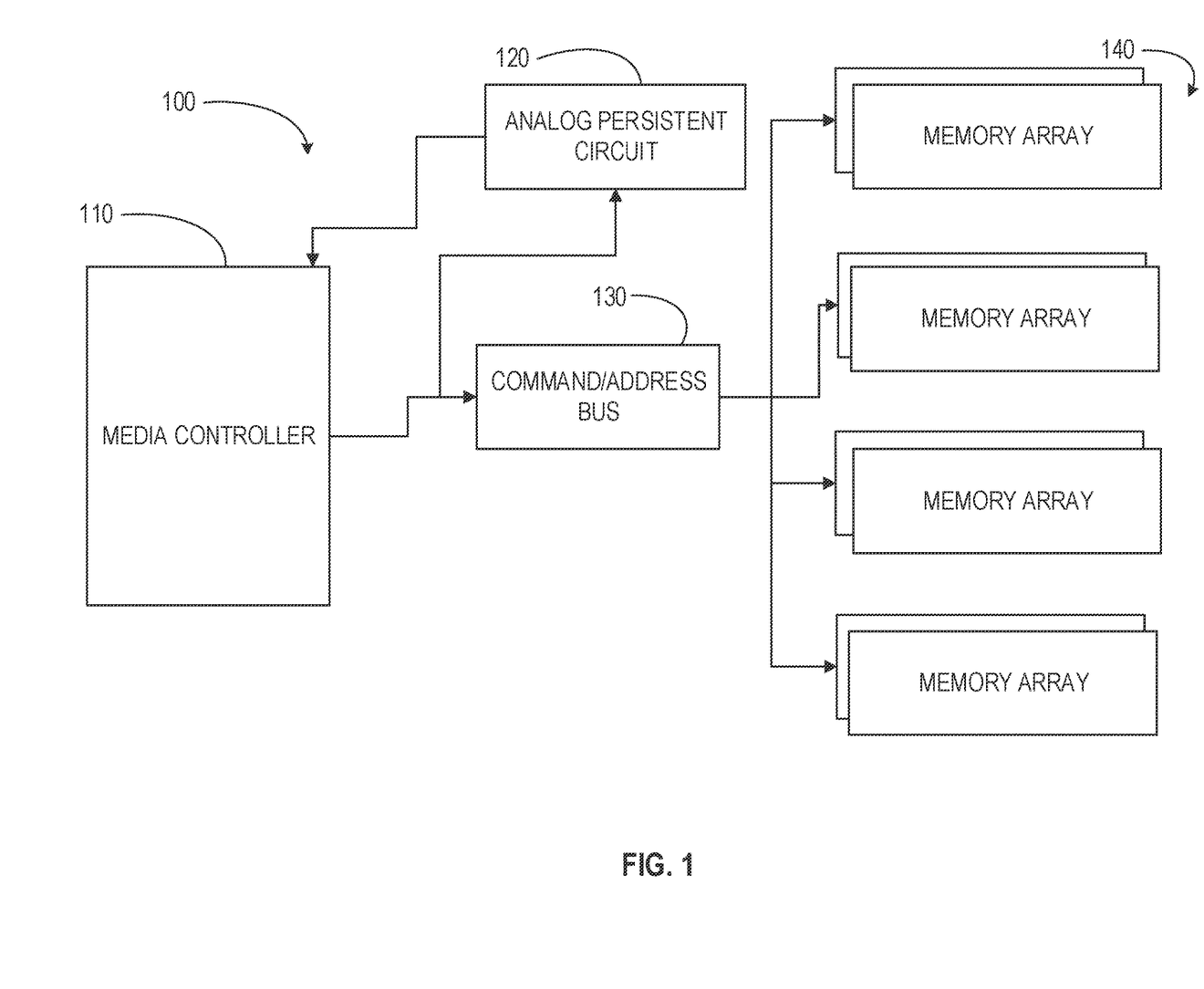
FIG. 1 depicts a block diagram of a memory system, according to at least one embodiment of the present disclosure.

Referring now to FIG. 1, a block diagram of a memory system 100 is shown in accordance with certain embodiments. The memory system 100 may be understood as a hardware circuit configured for tracking accesses made to end media, such as elements of a memory array. The memory system 100 includes a media controller 110, an analog persistent circuit 120, a command/address bus 130, and a memory array 140. The analog persistent circuit 120 may be coupled to the media controller 110 and the command/address bus 130 and operate to track accesses made to media within the memory array 140. The command/address bus 130 may be coupled to the media controller 110, the analog persistent circuit 120, and the memory array 140. The memory array 140 may be coupled to the command/address bus 130 and the media controller 110.

The media controller 110 is a memory controller circuit. In some embodiments, the memory controller 110 is a digital circuit managing memory access and other memory functions. The media controller 110 may generate control signals for memory functions and control timing relating to memory functions. In some instances, the media controller 110 manages memory access, memory maintenance and control functions, and data flowing to and from the memory array 140. The media controller 110 may be configured to perform different memory control, maintenance, and access functions based on a type of memory circuits contained within the memory array 140. The media controller 110 may mitigate failure modes associated with differing memory types of the memory array 140, based on information contained within the analog persistent circuit 120.

In embodiments where the memory array 140 contains DRAM memory, the memory controller 110 may be a DRAM controller and may configured to control access to rows within DRAM memory. The memory controller 110 may also be configured to perform memory management and mitigation functions such as row-hammering detection and mitigation, wear-leveling, data rotation, locality improvements, or other memory mitigation and maintenance operations. In instances where the memory array 140 contains flash memory, the memory controller 110 may be a flash controller configured to perform memory management and mitigation functions such as data migration between memory blocks and flash memory voltage control and modification. Where the memory array 140 contains NV-RAM, the memory controller 110 may be configured to control access to rows in NV-RAM memory and perform memory management and mitigation functions such as wear-leveling, endurance improvements, and other relevant memory mitigation and maintenance operations.

In some embodiments, the media controller 110 is configured to interact with and perform mitigation or maintenance operations on the analog persistent circuit 120. The media controller 110 may scrub, calibrate, erase, or update elements within the analog persistent circuit 120. The media controller 110 may perform mitigation or maintenance operations on the analog persistent circuit 120 based on information contained within the analog persistent circuit 120, information relating to the performance of the analog persistent circuit 120, or information relating to memory accesses of the memory array 140 relevant to the analog persistent circuit 120.

The analog persistent circuit 120 may be configured as a circuit positioned within the memory system 100, coupled to the command/address bus 130 and the media controller 110. The analog persistent circuit 120 may contain access information and provide hardware-level monitoring of memory access. The analog persistent circuit 120 may provide memory access monitoring as an analog persistent row access or block access circuit. Analog weights stored in the analog persistent circuit 120 may be encoded based on available memory space and programmable states. The analog weights may be representative of an encoded aggregate of the access frequency to the memory array 140 that can be accessed by the media controller 110 in-situ during runtime. In some embodiments, the analog persistent circuit 120 maintains block/page accesses to the memory array 140 by programming PCM states corresponding to access rates. The programming of PCM states may be performed agnostic and in-situ to data transfer to the memory array 140 by monitoring the command/address bus 130 and updating the analog persistent PCM states corresponding to page programs and erases. The media controller 110 can then perform read operations of the analog persistent circuit.

Figure 2A:
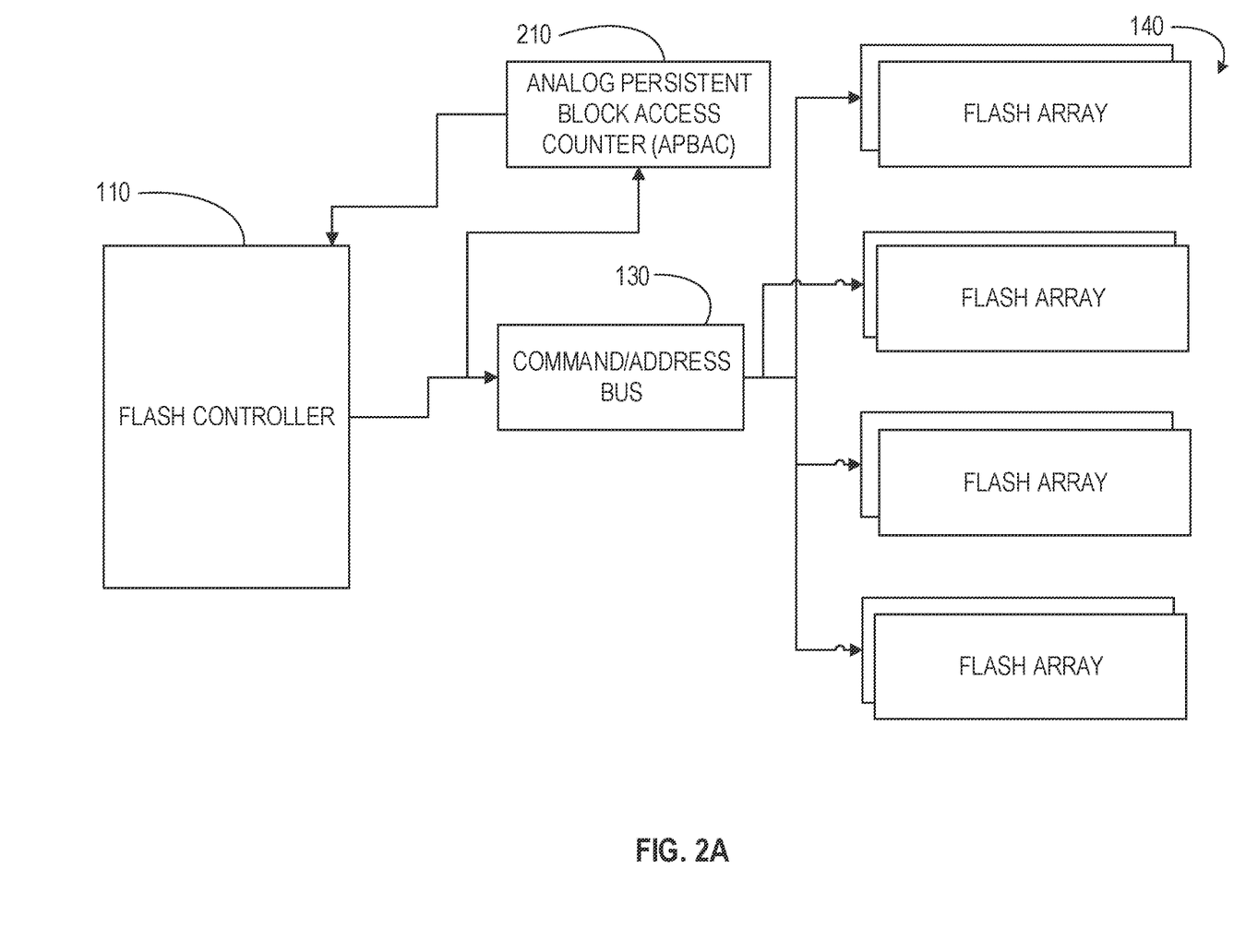
FIG. 2A depicts a block diagram of a memory system, according to at least one embodiment of the present disclosure.
Figure 2B:
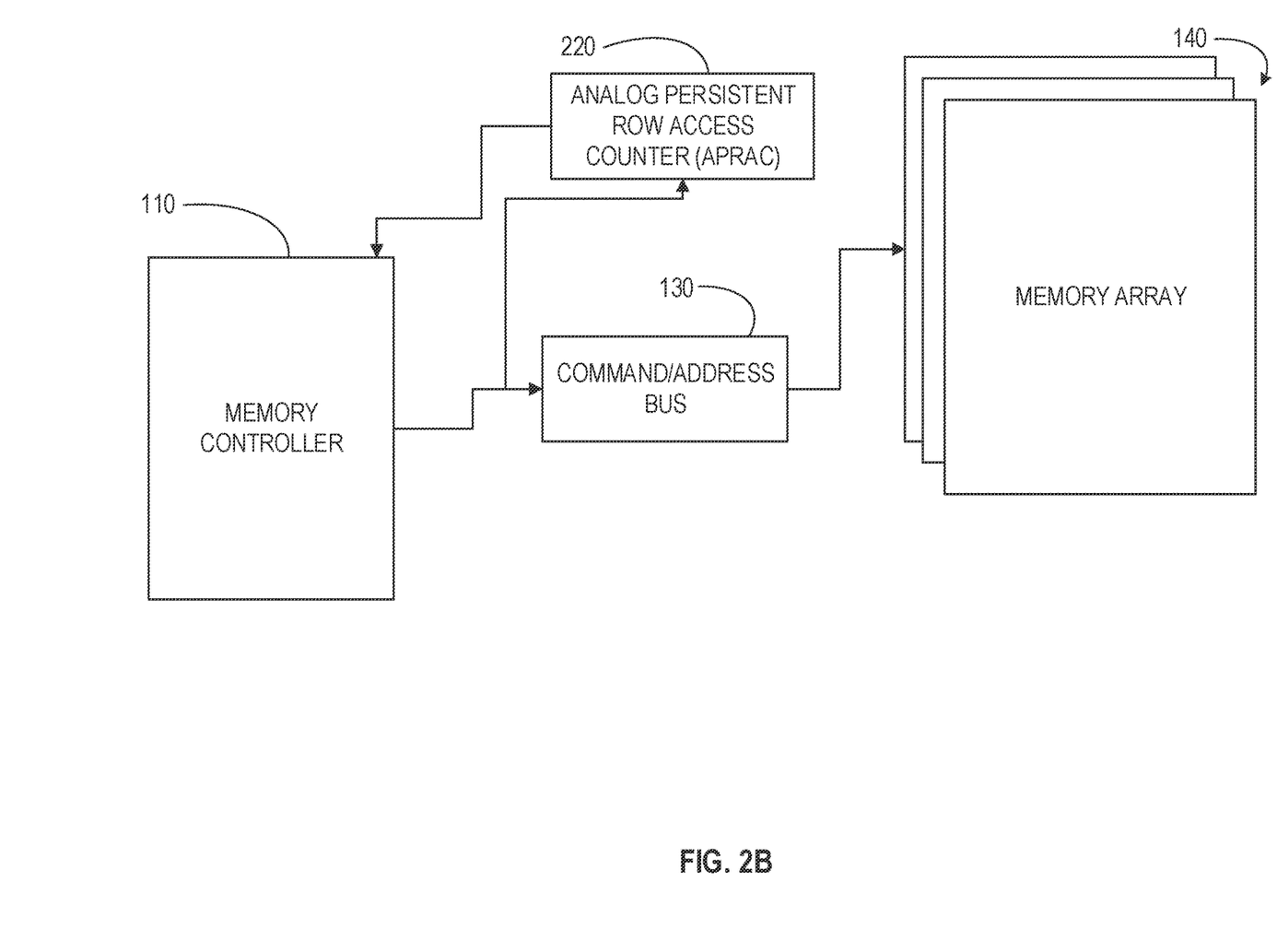
FIG. 2B depicts a block diagram of a memory system, according to at least one embodiment of the present disclosure.
Figure 2C:
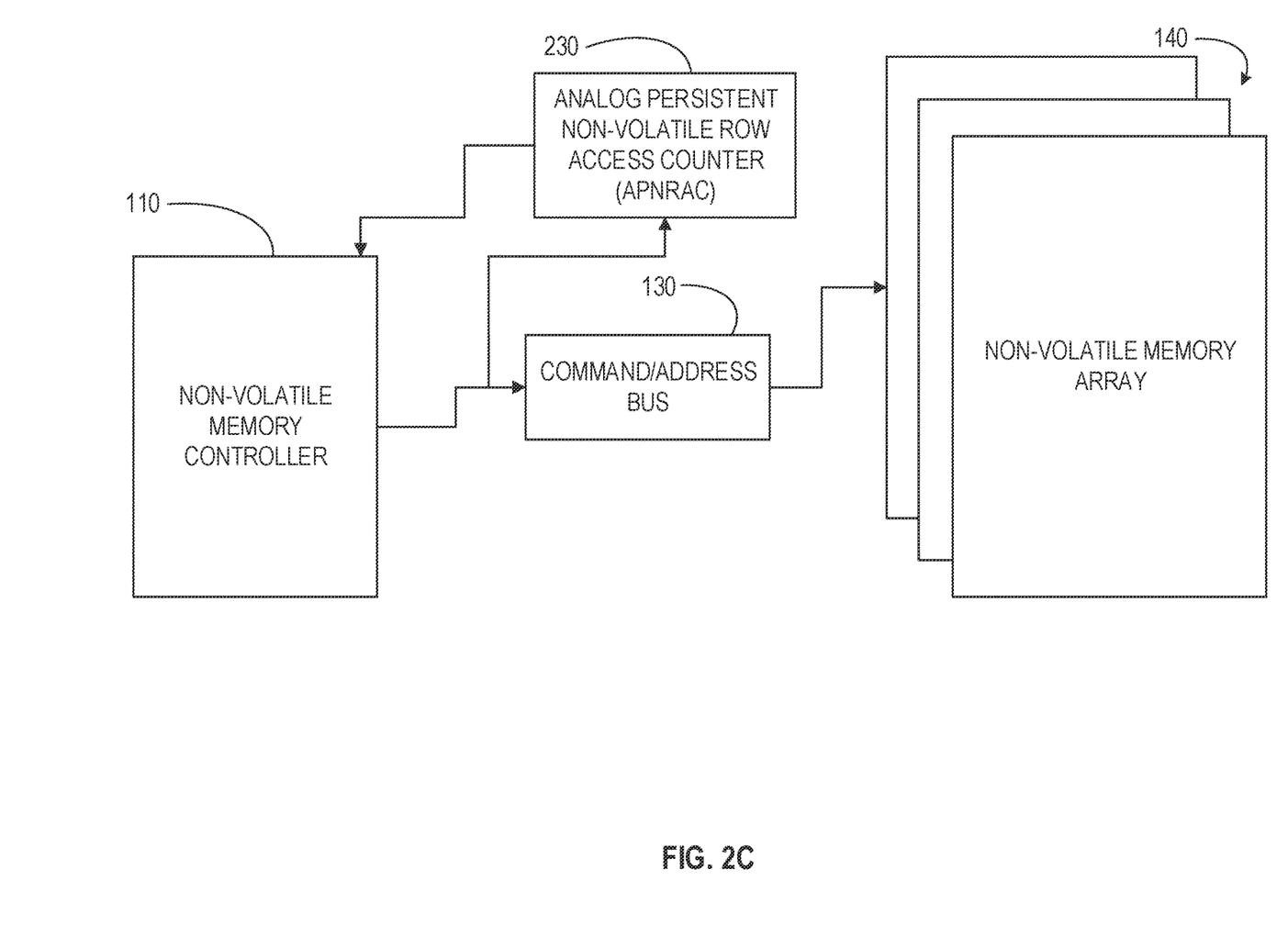
FIG. 2C depicts a block diagram of a memory system, according to at least one embodiment of the present disclosure.

Embodiments of the analog persistent circuit 120 may be configured based on a type of memory within the memory array 140. In embodiments where the memory array 140 is a flash memory array, the analog persistent circuit 120 may be an analog persistent block access counter (APBAC) 210, as shown in FIG. 2A. In such instances, a weight update pulse is passed to the APBAC circuit corresponding to an access of a flash chip of the flash array. In some embodiments, the memory system 100 includes a set of APBAC circuits. For example, the memory system 100 may include an APBAC circuit for each flash chip of the flash array or an APBAC circuit for each subset of flash chips within a flash array. In embodiments where the memory array 140 is a DRAM array, the analog persistent circuit 120 may be an analog persistent row access counter (APRAC) 220, as shown in FIG. 2B. In such instances, a weight update pulse is passed to each APRAC circuit. The weight pulse may correspond to Rank/Bank/Row access of a DRAM memory element of the DRAM array. The memory system 100 may contain a set of APRAC circuits. In such instances, the memory system 100 may include an APRAC circuit for each DRAM chip or an APRAC circuit for a subset of DRAM chips of the DRAM array. In embodiments where the memory array 140 is a NV-RAM array, the analog persistent circuit 120 may be an analog persistent non-volatile row access counter (APNRAC) 230, as shown in FIG. 2C. In such instances, a weight update pulse may be passed to each APRAC circuit corresponding to Rank/Bank/Row access of an NV-RAM memory element of the NV-RAM array. The memory system 100 may include an APRAC circuit for each NV-RAM element or an APRAC circuit for a subset of NV-RAM elements of the NV-RAM array.

The command/address bus 130 may be a circuit, bus, or component configured to transfer signals from the media controller 110 to the memory array 140. The command/address bus 130 may transfer command or instruction signals from the media controller 110 to the memory array 140 as a uni-directional or bi-directional memory bus. The command/address bus 130 may be coupled to the media controller 110 and the analog persistent circuit 120 such that commands passed between the media controller 110 and the command/address bus 130 are monitored by the analog persistent circuit 120 in real-time or near real-time. The command/address bus 130 may be monitored by the analog persistent circuit 120 without impeding or delaying passage of commands between the media controller 110 and the command/address bus 130.

The memory array 140, acting as end media of the memory system 100, may include a set of memory chip components or physical storage elements for the memory system. In some instances, the memory array 140 contains a plurality of sets of memory chips, such that the memory array 140 includes a plurality of subsets of memory chip components, with each subset of memory chip components comprising more than one memory chip. The memory array 140 may include DRAM arrays, Flash arrays, NV-RAM arrays, or any other suitable arrays of physical memory components.

Figure 3:
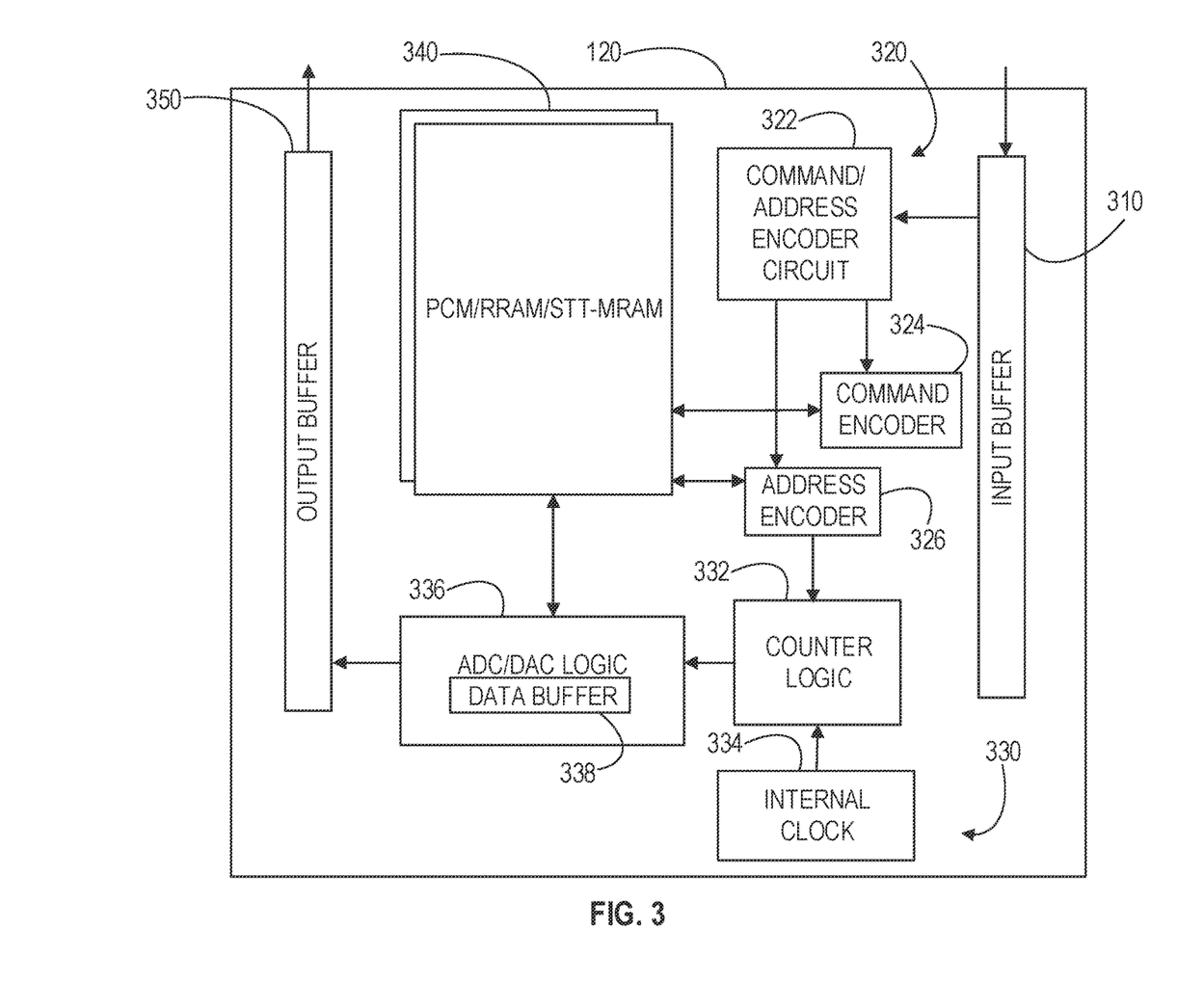
FIG. 3 depicts a block diagram of an analog persistent circuit, according to at least one embodiment of the present disclosure.

Referring now to FIG. 3, a block diagram of the analog persistent circuit 120 is shown in accordance with certain embodiments. In some embodiments, the analog persistent circuit 120 includes an input buffer 310, a command component 320, a logic component 330, a memory component 340, and an output buffer 350. The input buffer 310 may be configured to receive access signals from the command/address bus 130. The input buffer 310 may receive the access signals by monitoring a link coupling the media controller 110 and the command/address bus 130, such that the input buffer 310 receives access signals or instructions by the media controller 110 for access to components of the memory array 140 in real-time. In some instances, the input buffer 310 is configured to receive memory controller command inputs from the media controller 110. The command component 320 may be coupled to the input buffer 310. In some embodiments, the command component 320 is configured to process access signals from the command/address bus 130. The logic component 330 may be coupled to the command component 320. In some instances, the logic component 330 is configured to process the access signals into one or more access counts. The logic component 330 may also be configured to generate analog weights from the access signals received through the input buffer 310. The logic component 330 may also generate analog weights from the access signals and one or more access counts. In some embodiments, the memory component 340 is coupled to the command component 320 and the logic component 330. The memory component 340 may be configured to store access counts within the analog persistent circuit 120. The memory component 340 may comprise PCM, RRAM, STT-MRAM, or any other suitable memory chip or component capable of being and configured to be positioned within the analog persistent circuit 120. In some embodiments, the output buffer 350 is coupled to the logic component 330. The output buffer 350 may be configured to pass access count data to the media controller 110 or other memory controller.

In some embodiments, the command component 320 is composed of multiple components. The command component 320 may include a command/address encoder circuit 322, a command decoder 324, and an address decoder 326.

In some embodiments, the logic component 330 is composed of multiple components. The logic component 330 may include a counter circuit 332, an internal clock 334, an analog-to-digital converter (ADC) and digital-to-analog converter (DAC) or ADC/DAC component 336, and a logic data buffer 338. In some instances, the internal clock 334 is clock circuitry internal to the analog persistent circuit 120. The counter circuit 332 may be a component or circuitry and associated counter logic configured to receive access count information The internal clock 334 may also be an internal system clock of a computer system communicatively coupled to the analog persistent circuit 120. In some embodiments, the ADC/DAC component 336 and the data buffer 338 occupy the same circuitry or component. The ADC/DAC component 336 may include conversion circuitry and logic configured to convert analog signals to digital signals and digital signals to analog signals.

Figure 4:
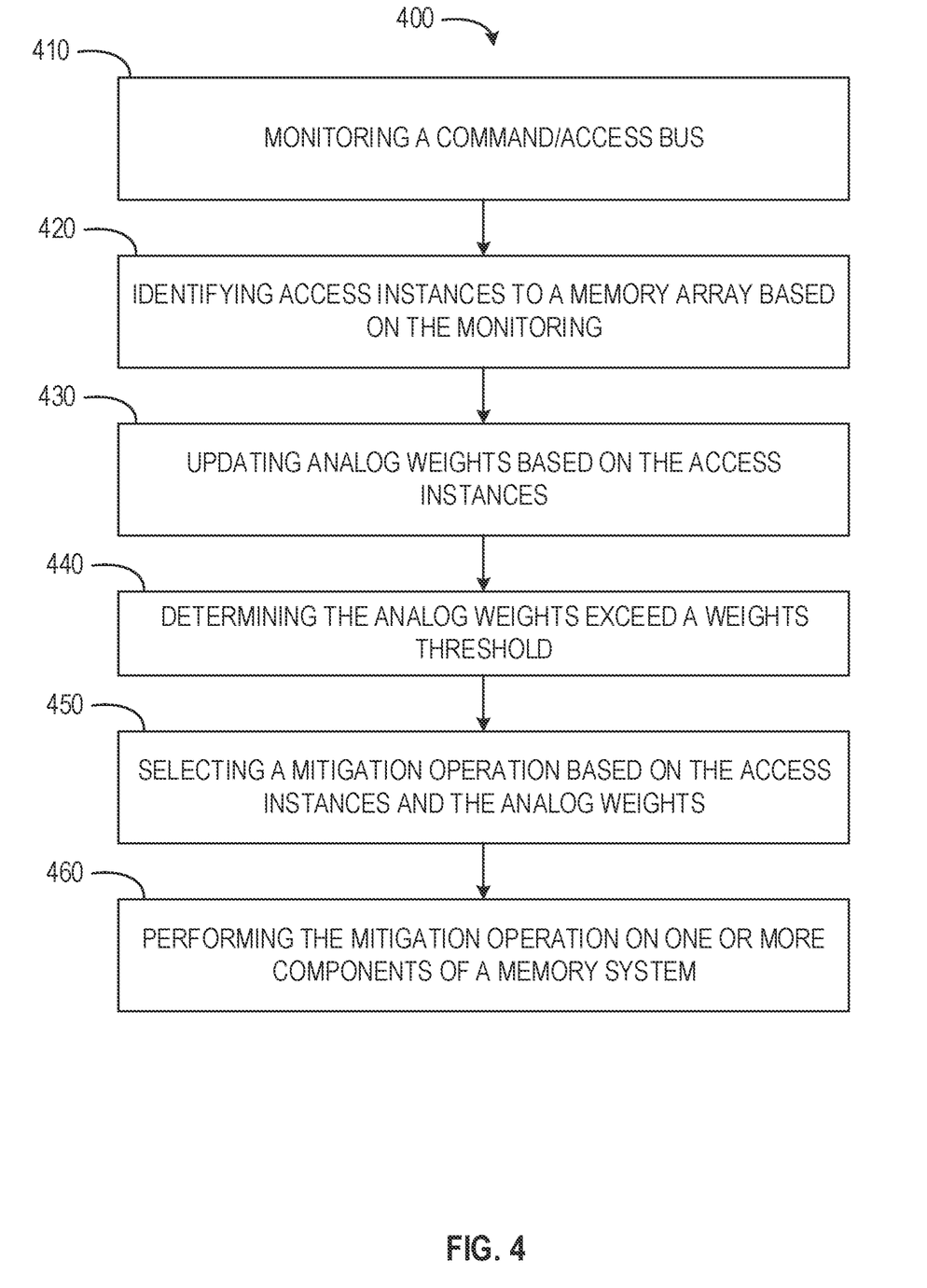
FIG. 4 depicts a flow diagram of a computer-implemented method for storage access monitoring, according to at least one embodiment of the present disclosure.

Referring now to FIG. 4, a flow diagram of a computer-implemented method 400 is shown. The computer-implemented method 400 is a method for memory system storage access. In some embodiments, the computer-implemented method 400 may be performed by one or more components of the memory system 100, as described in more detail below.

At operation 410, the analog persistent circuit 120 monitors the command/address bus 130. The analog persistent circuit 120 may monitor the command/address bus 130 by detecting or snooping signals passed to the command/address bus 130 from the media controller 110.

At operation 420, the analog persistent circuit 120 identifies access instances to the memory array 140. The analog persistent circuit 120 may identify the access instances based on monitoring the command/address bus 130 in operation 410. In some embodiments, each analog memory unit of the analog persistent circuit 120 may represent a certain block in the memory array 140. The block may be a page, bank, segment, or row of the memory array 140 depending on the type of memory elements of the memory array 140 and a tracking scheme configured within the analog persistent circuit 120.

In some embodiments, the analog persistent circuit 120 monitors access instances by receiving an update pulse. The update pulse may correspond to access of a component of the memory array 140. For example, the update pulse may correspond to access of at least one flash chip of a flash memory of the memory array 140. The APBAC embodiment of the analog persistent circuit 120 may be connected to flash dies or chips and a flash controller (e.g., the media controller 110). The APBAC may be aware of the blocks accessed through the command/address bus 130 commands sent to the flash dies. In such instances, an update pulse may be fed to each APBAC circuit corresponding to the flash memory chip accessed.

In some embodiments, the update pulse corresponds to a specified row or block of the memory array 140. The update pulse may correspond to a rank/bank/row access of a DRAM memory chip or NV-RAM memory chip. For example, where the memory array 140 comprises a DRAM array or an NV-RAM array, the update pulse may correspond to an access of a specified row within a component of the memory array 140. In such instances, an update pulse may be fed to each APRAC circuit corresponding to rank/bank/row access. Where the update pulse is associated with access to a DRAM chip, the accesses may be encoded with compression in the APRAC circuit based on multi-state PCM programmability. Thus, the APRAC may be aware of the row addresses accessed through the command/address bus 130 to each of the DRAM ranks.

At operation 430, the analog persistent circuit 120 updates analog weights based on the access instances. The analog weights may be representative of an encoded aggregate of the access frequency which can be accessed by the media controller 110 in-situ during runtime. The analog persistent circuit 120 may be updated automatically with each memory access detected or received by the analog persistent circuit 120. The analog weight may be a monotonical increment of weight. In some embodiments, the weight update pulse is a universal pulse controlled by a clock cycle of the memory system 100. Upon each access, the analog weight may be updated and information relating to a type or location of memory access may be simultaneously incremented or written. The analog weights may be stored in the analog persistent circuit 120 and encoded based on available memory space within the analog persistent circuit 120 and suitable programmable states.

In some embodiments, once the analog weight is over a threshold for the specified block, the corresponding memory block within the analog persistent circuit 120 is scrubbed. Upon scrubbing the memory block, the analog counter or analog weight may be reset to zero.

At operation 440, the media controller 110 determines the analog weights exceed a weights threshold. The weights threshold may be controlled or indicated by temperature, field strength, data retention requirements, combinations thereof, or any other suitable and relevant aspect or criteria of the memory array 140. The media controller 110 may determine the analog weight exceeds the weights threshold based on a signal passed from the analog persistent circuit 120 to the media controller 110. In some instances, the analog persistent circuit 120 detects the weight is over the weight threshold and passes an alert to the media controller 110.

In some instances, the media controller 110 determines the analog weights exceeds the weights threshold by reading out the APRAC embodiment of the analog persistent circuit 120. In such instances, the media controller 110 may read out the APRAC data based on a signal received from the analog persistent circuit 120, indicating the analog weight. The media controller 110 may read the APRAC data at specified intervals. The media controller 110 may also read the APRAC data based on activity or rate of memory activity between the media controller 110 and the memory array 140.

At operation 450, the media controller 110 selects a mitigation operation. The mitigation operations may be performed on the memory array 140. The media controller 110 may select the mitigation operation based on the access instances. For example, depending on values stored in each analog memory unit of the analog persistent circuit 120, the media controller 110 may select a mitigation operation to address specific failure modes associated with a memory type of the memory array 140. In selecting based on access instances, the mitigation operations may select the mitigation operation based on the analog weights stored within the analog persistent circuit 120. The media controller 110 may also select the mitigation operation based on a combination of a target memory or target memory type being monitored, encoding schemes associated with the target memory, and the access instances or analog weights. Media controller 110 actions may differ and help mitigate challenges pertaining to the specific target memory being monitored. In some instances, the media controller 110 selects the mitigation operation based on a signal passed to the media controller 110 from the analog persistent circuit 120 indicating the weights threshold being exceeded. In such instances, the analog persistent circuit 120 may pass a signal indicating a type of mitigation operation to be performed based on exceeding the weights threshold.

In some instances, the mitigation operations may be selected from critical memory management routines. The media controller 110 may select mitigation operations such as endurance monitoring, row-hammering detection, row-hammering mitigation, wear-leveling, data migration, locality improvements, voltage changes, voltage threshold recalibration, or any other suitable mitigating operations on the memory array. Data migration may include moving hot and cold data between less frequently used and more frequently used blocks within a flash array, based on information stored in the APBAC embodiment of the analog persistent circuit 120. Voltage threshold recalibration may be performed to minimize bit-error rate (BER). In some embodiments, modification of voltages or recalibration may be performed for flash arrays to maintain BER within prescribed thresholds of error correction code memory (ECC memory).

For example, the media controller 110 may read the memory access recording, performed in-situ with real-time snooping of the command/address bus 130, to detect row-hammering and mitigate victim rows. In such instances, a constraint on PCM resolution may be relaxed while a pattern of heavy access to target rows are recorded in the analog persistent circuit 120.

In some embodiments, the media controller 110 selects mitigation operations to perform on the analog persistent circuit 120. The media controller 110 may select the mitigation operation s based on the access instances, the analog weights, or combinations thereof. The media controller 110 may select mitigation operations to perform on the analog persistent circuit 120 from a group of maintenance operations. APBAC and APRAC embodiments of the analog persistent circuit 120 may be aware of resistance drifts and have compensations in place capable of being employed by the media controller 110 as part of mitigation operations performed on the analog persistent circuit 120.

At operation 460, the media controller 110 performs the mitigation operation on one or more components of the memory system 100. The media controller 110 may be configured to perform mitigation operations in response to one or more values stored in the analog persistent circuit 120 during monitoring of access to the memory of the memory array 140.

In embodiments where the analog persistent circuit 120 is an APBAC and the memory array 140 is a flash memory, the media controller 110 may perform data migration as the mitigation operation. Data migration may be performed by moving stored information between memory blocks within the flash memory.

In instances where the analog persistent circuit 120 is an APBAC and the memory array 140 is a flash memory array, the media controller 110 may modify flash memory voltages as the mitigation operation. The modification of the flash memory voltages may be performed based on the access instances of the flash array.

In embodiments where the analog persistent circuit 120 is an APRAC and the memory array 140 is a DRAM memory, the media controller 110 may perform row-hammering detection and mitigation as the mitigation operation. In instances of an APRAC and DRAM memory, the media controller 110 may perform wear-leveling as the mitigation operation.

In embodiments where the analog persistent circuit is an APRAC or APNRAC and the memory array 140 is an NV-RAM array, the media controller 110 may operate as a non-volatile memory controller and may perform wear-leveling at the mitigation operation.

In some embodiments, the media controller 110 performs mitigation or maintenance operations on the analog persistent circuit 120. In such instances, the media controller 110 may perform maintenance operations on the analog persistent circuit 120 based on one or more of the analog weights and the access instances.

Figure 5:
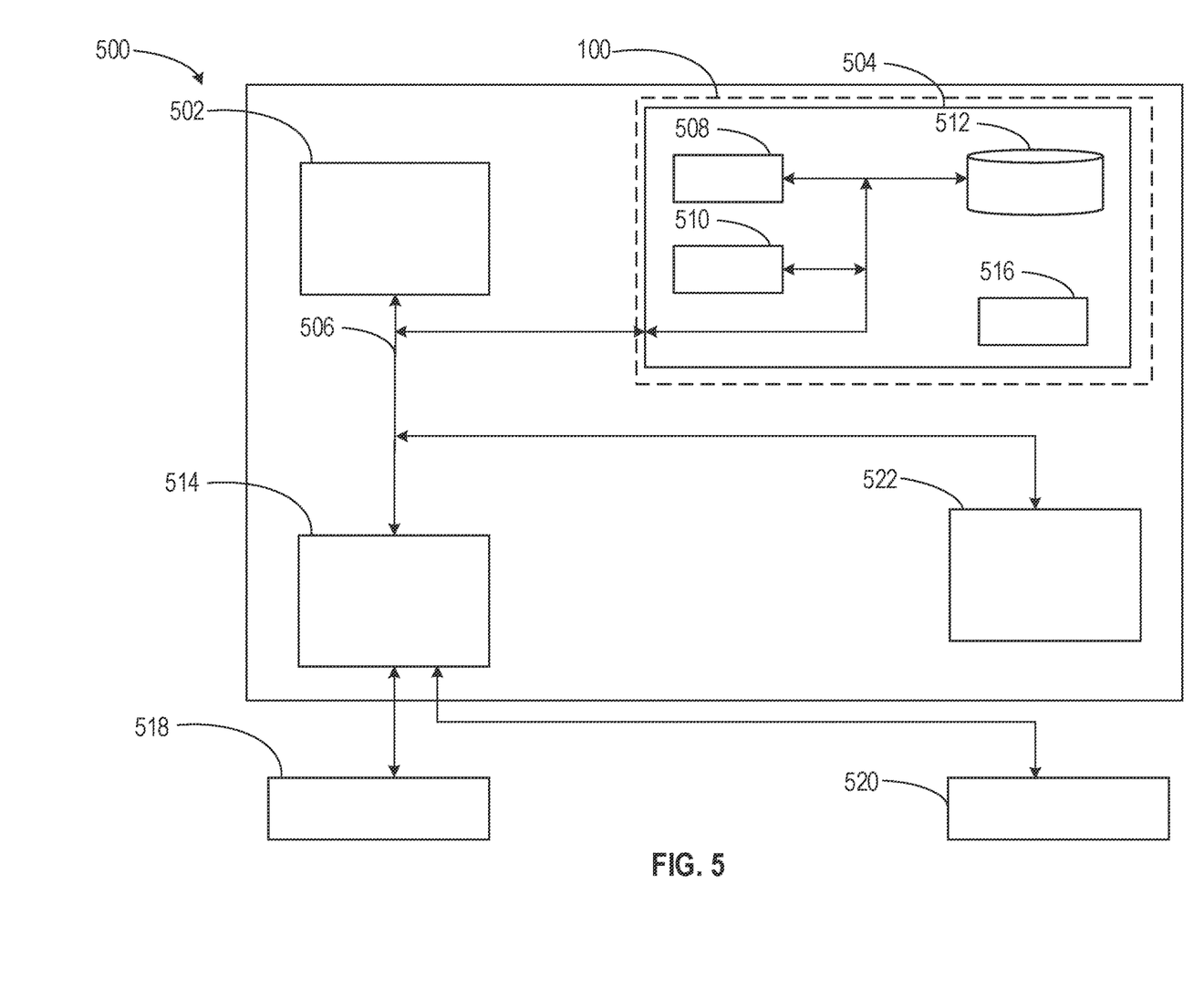
FIG. 5 depicts a block diagram of a computing system incorporating the memory system of FIG. 1, according to at least one embodiment of the present disclosure.

Embodiments of the present disclosure may be implemented together with virtually any type of computer, regardless of the platform is suitable for storing and/or executing program code. FIG. 5 shows, as an example, a computing system 500 (e.g., cloud computing system) suitable for executing program code.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may be implemented as the memory system 100. In some instances, the system memory 504 may include computer system readable media in the form of volatile memory, such as random-access memory (RAM) 508 and/or cache memory 510 as part of the memory array 140. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
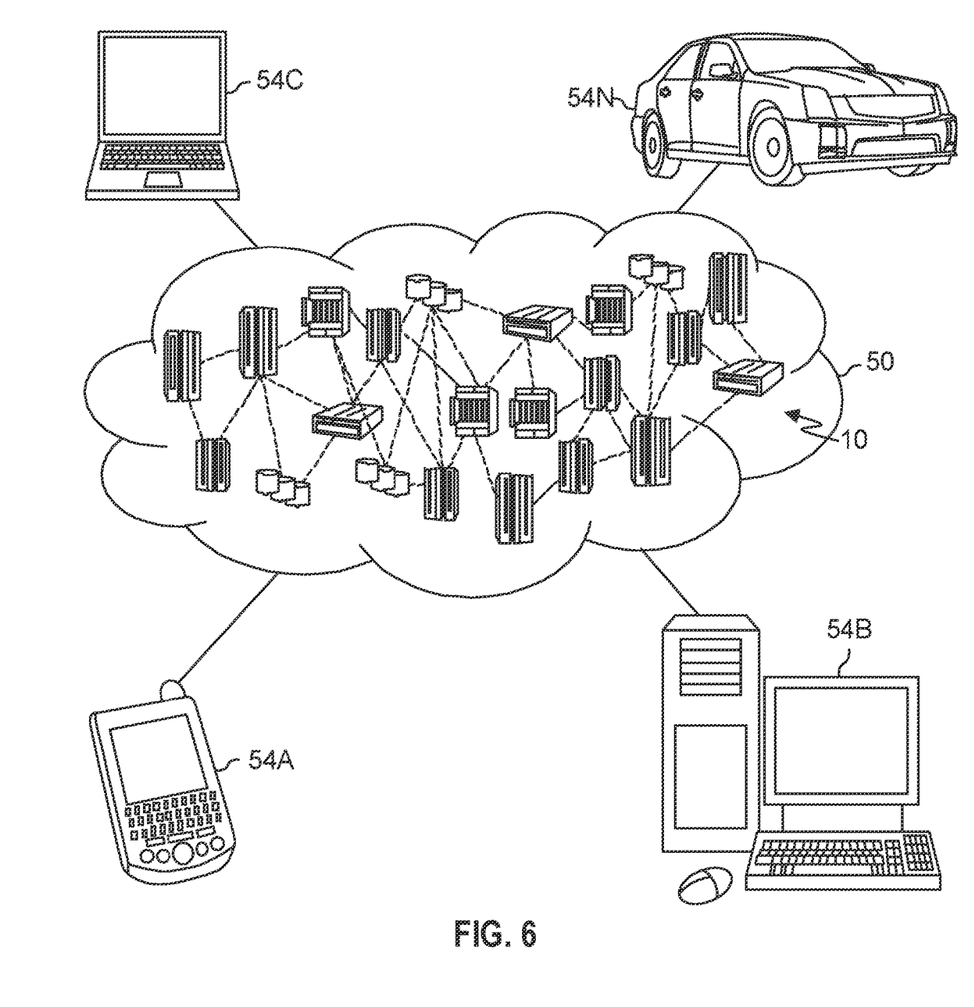
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Each node may include an implementation of the memory system 100 as part of operational memory within the node. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
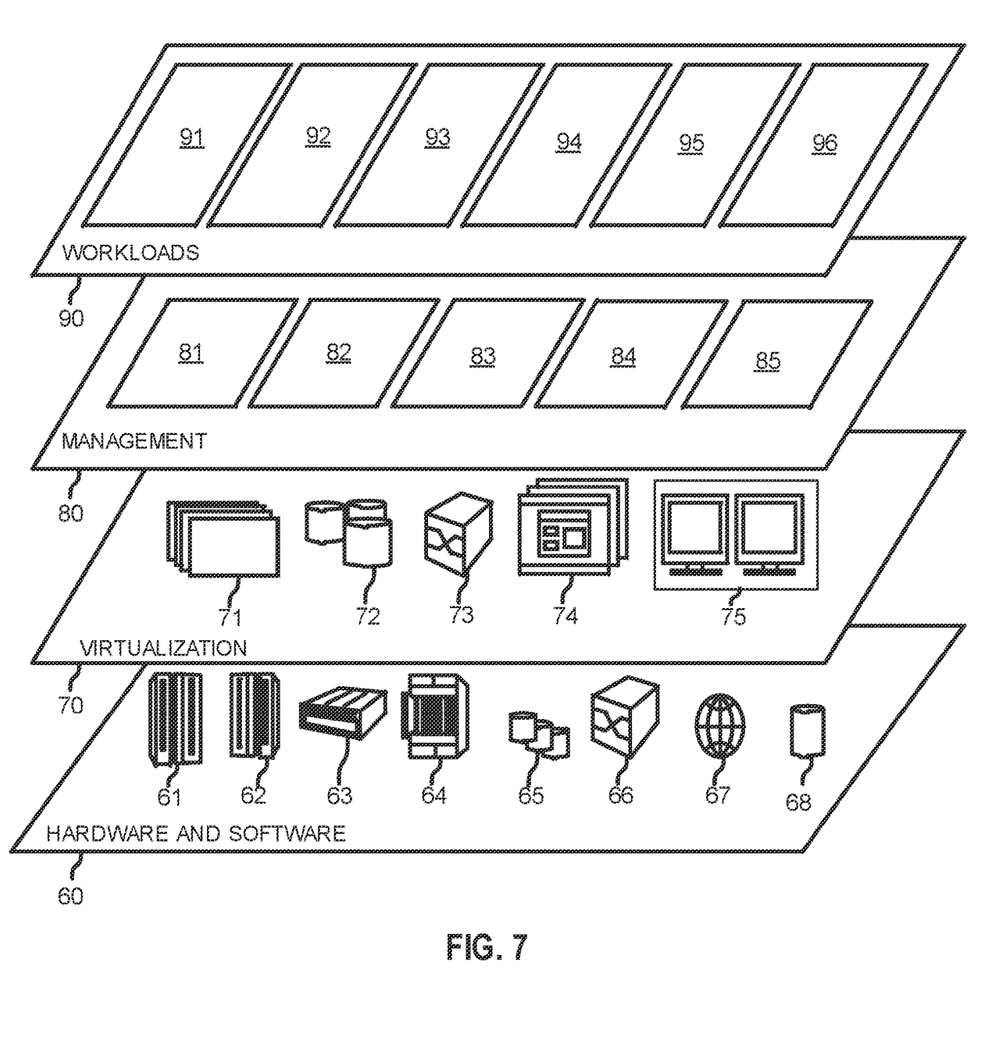
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory access and mitigation logging 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A memory system, comprising:
a media controller of a memory;
an analog persistent circuit coupled to the media controller, the analog persistent circuit configured to monitor access to the memory;
a command address bus coupled to the analog persistent circuit; and
a memory array communicatively coupled to the command address bus and the media controller,
wherein the media controller is a flash controller, and the analog persistent circuit is an analog persistent block access counter configured to monitor access to blocks within a flash memory.

2. The memory system of claim 1, wherein the analog persistent block access counter is configured to monitor access by receiving an update pulse corresponding to access of at least one flash chip of the flash memory.

3. A memory system, comprising:
a media controller of a memory;
an analog persistent circuit coupled to the media controller, the analog persistent circuit configured to monitor access to the memory;
a command address bus coupled to the analog persistent circuit; and
a memory array communicatively coupled to the command address bus and the media controller,
wherein the analog persistent circuit is an analog persistent row access counter configured to monitor access to rows within a DRAM memory.

4. The memory system of claim 3, wherein an analog persistent block access counter is configured to monitor access by receiving an update pulse corresponding to access of at least one flash chip of a flash memory.

5. A memory system, comprising:
a media controller of a memory;

an analog persistent circuit coupled to the media controller, the analog persistent circuit configured to monitor access to the memory;
a command address bus coupled to the analog persistent circuit; and
a memory array communicatively coupled to the command address bus and the media controller,
wherein the media controller is a non-volatile memory controller and the analog persistent circuit is an analog persistent non-volatile row access counter configured to monitor access made to rows within a non-volatile RAM.

6. A memory system, comprising:
a media controller of a memory;
an analog persistent circuit coupled to the media controller, the analog persistent circuit configured to monitor access to the memory;
a command address bus coupled to the analog persistent circuit; and
a memory array communicatively coupled to the command address bus and the media controller,
wherein the analog persistent circuit is configured to monitor access to the memory by receiving an update pulse corresponding to access of a row of the memory array.

7. A memory system, comprising:
a media controller of a memory;
an analog persistent circuit coupled to the media controller, the analog persistent circuit configured to monitor access to the memory;
a command address bus coupled to the analog persistent circuit; and
a memory array communicatively coupled to the command address bus and the media controller,
wherein the media controller is configured to perform mitigation operations in response to one or more values stored in the analog persistent circuit during monitoring of access to the memory.

8. A computer implemented method, comprising:
monitoring, by an analog persistent circuit, a command address bus coupled to a memory array;
identifying, by the analog persistent circuit, access instances to the memory array based on the monitoring of the command address bus;
updating, by the analog persistent circuit, analog weights based on the access instances;
determining, by a media controller, that the analog weights exceed a weights threshold; and
selecting, by the media controller, a mitigation operation to perform on the memory array based on the access instances.

9. The method of claim 8, wherein the analog persistent circuit is an analog persistent row access counter and the memory array is a DRAM memory, the method further comprising:
performing, by the media controller, row-hammering mitigation as the mitigation operation.

10. The method of claim 8, wherein the analog persistent circuit is an analog persistent row access counter and the memory array is a DRAM memory, the method further comprising:
performing, by the media controller, wear-leveling as the mitigation operation.

11. The method of claim 8, wherein the analog persistent circuit is an analog persistent block access counter and the memory array is a flash memory, the method further comprising:
performing, by the media controller, data migration between memory blocks within the flash memory.

12. The method of claim 8, wherein the analog persistent circuit is an analog persistent block access counter and the memory array is a flash memory, the method further comprising:
modifying, by the media controller, flash memory voltages based on the access instances.

13. The method of claim 8, wherein the analog persistent circuit is an analog persistent non-volatile row access counter and the memory array is a non-volatile RAM, the method further comprising:
performing, by the media controller, wear-leveling as the mitigation operation.

14. The method of claim 8, the method further comprising:
performing, by the media controller, one or more maintenance operations on the analog persistent circuit based on one or more of the analog weights and the access instances.

15. An analog persistent memory circuit, comprising:
an input buffer configured to receive access signals from a command/address bus;
a command component coupled to the input buffer, the command component configured to process access signals from the command/address bus;
a logic component coupled to the command component, the logic component configured to process the access signals into one or more access counts;
a memory component coupled to the command component and the logic component; the memory component configured to store access counts; and
an output buffer coupled to the logic component, the output buffer configured to pass access count data to a memory controller.

16. The analog persistent memory circuit of claim 15, wherein the input buffer is further configured to receive memory controller command inputs from the memory controller.

17. The analog persistent memory circuit of claim 15, wherein the command component includes a command/address encoder circuit, a command decoder, and an address decoder.

18. The analog persistent memory circuit of claim 15, wherein the logic component includes counter logic, an internal clock, and a logic data buffer.

19. The analog persistent memory circuit of claim 18, wherein the logic component includes an analog-to-digital converter and a digital-to-analog converter.

20. The analog persistent memory circuit of claim 15, wherein the logic component is further configured to generate analog weights from the access signals and the one or more access counts.

* * * * *